US012761494B2

(12) United States Patent
Eil

(10) Patent No.: US 12,761,494 B2
(45) Date of Patent: Oct. 13, 2026

(54) PARTIAL POLARIZATION BEAMSPLITTER FOR AN OPTICAL SYSTEM

(71) Applicant: ALCON INC., Fribourg (CH)

(72) Inventor: Martin Eil, Berlin (DE)

(73) Assignee: Alcon Inc., Fribourg (CH)

( * ) Notice: Subject to any disclaimer, the term of this patent is extended or adjusted under 35 U.S.C. 154(b) by 188 days.

(21) Appl. No.: 18/612,403

(22) Filed: Mar. 21, 2024

(65) Prior Publication Data

US 2024/0329417 A1 Oct. 3, 2024

Related U.S. Application Data

(60) Provisional application No. 63/492,625, filed on Mar. 28, 2023.

(51) Int. Cl.
*G02B 27/28* (2006.01)
*G02B 21/36* (2006.01)

(52) U.S. Cl.
CPC ......... *G02B 27/283* (2013.01); *G02B 21/361* (2013.01)

(58) Field of Classification Search
CPC ............................ G02B 27/283; G02B 21/361
See application file for complete search history.

(56) References Cited

U.S. PATENT DOCUMENTS

| | | | | |
|---|---|---|---|---|
| 9,678,277 | B2 * | 6/2017 | Zhou | G02B 6/29361 |
| 12,546,998 | B2 * | 2/2026 | Preece | G02B 27/0101 |
| 2017/0075100 | A1 * | 3/2017 | Awdeh | G02B 21/0012 |
| 2023/0035415 | A1 * | 2/2023 | Kamenev | G01B 11/0675 |
| 2023/0393409 | A1 * | 12/2023 | Yang | G02B 27/108 |

FOREIGN PATENT DOCUMENTS

WO 2022084190 A1 4/2022

* cited by examiner

*Primary Examiner* — Nathanael R Briggs

(57) ABSTRACT

In certain embodiments, a beamsplitter includes a substrate and an interior plane within the substrate. The substrate comprises a transparent material and surfaces that receive light from a sample and an overlay projector and transmit light towards oculars and a camera. The interior plane includes a central partially reflective portion and an outer transmissive portion. The central partially reflective portion: transmits a portion of light to direct light from the sample towards the oculars; reflects a remaining portion of light to direct light from the sample towards the camera; and reflects light to direct light from the overlay projector towards the oculars. The outer transmissive portion: transmits light to direct light from the sample towards the oculars; and transmits light to direct light from the overlay projector towards an aperture that blocks the light.

15 Claims, 3 Drawing Sheets

PARTIAL POLARIZATION BEAMSPLITTER FOR AN OPTICAL SYSTEM

TECHNICAL FIELD

The present disclosure relates generally to optical beamsplitters, and more particularly to a partial polarization beamsplitter for an optical system.

BACKGROUND

An optical system, such as a microscope, may include optical components that deliver light beams from different sources to different destinations. For example, a microscope may include oculars that allow a user to view a sample, an overlay projector that provides an overlay for the sample image, and a camera that records the sample image. A beamsplitter may be used to direct light from the sample and overlay projector towards the camera and/or oculars.

BRIEF SUMMARY

In certain embodiments, a beamsplitter includes a substrate and an interior plane within the substrate. The substrate comprises a transparent material with an axis and surfaces comprising a first, second, third, and fourth surfaces. The first surface receives light from a sample; the second surface transmits light towards oculars; the third surface receives light from an overlay projector; and the fourth surface transmits light towards a camera. The interior plane includes a central partially reflective portion and an outer transmissive portion. The central partially reflective portion: transmits a portion of light from the first surface to the second surface to direct light from the sample towards the oculars; reflects a remaining portion of light from the first surface to the fourth surface to direct light from the sample towards the camera; and reflects light from the third surface to the first surface to direct light from the overlay projector towards the oculars. The outer transmissive portion: transmits light from the first surface to the second surface to direct light from the sample towards the oculars; and transmits light from the third surface to the fourth surface to direct light from the overlay projector towards an aperture that blocks the light.

Embodiments may include none, one, some, or all of the following features:

- The interior plane is positioned 40 to 50 degrees relative to the substrate axis.
- The central partially reflective portion is substantially centered about a center of the outer transmissive portion.
- The central partially reflective portion is offset from a center of the outer transmissive portion.
- The central partially reflective portion has a substantially square shape, as viewed from the third surface.
- The central partially reflective portion has a substantially circular shape, as viewed from the third surface.
- The central partially reflective portion has a polarization filter that transmits light having a first polarization and reflects light having a second polarization. The light from the sample has the first polarization and the second polarization, and the light from the overlay projector has the second polarization.
- The aperture forms an opening with substantially the same shape as the central partially reflective portion.
- The aperture forms an opening that is up to 20 percent smaller than the central partially reflective portion.

In certain embodiments, a method for directing light includes receiving, by a beamsplitter, light from a sample and an overlay projector. The beamsplitter has a substrate comprising transparent material. The substrate has an axis and an interior plane with a central partially reflective portion and an outer transmissive portion. The substrate includes a first surface that receives light from the sample, a second surface that transmits light towards oculars, a third surface that receives light from the overlay projector, and a fourth surface that transmits light towards a camera. Light is transmitted by the outer transmissive portion from the first surface to the second surface to direct light from the sample towards the oculars. A portion of light is transmitted by the central partially reflective portion from the first surface to the second surface to direct light from the sample towards the oculars. A remaining portion of light is reflected by the central partially reflective portion from the first surface to the fourth surface to direct light from the sample towards the camera. Light is transmitted by the outer transmissive portion from the third surface to the fourth surface to direct light from the overlay projector towards an aperture that blocks the light. Light is reflected by the central partially reflective portion from the third surface to the first surface to direct light from the overlay projector towards the oculars.

Embodiments may include none, one, some, or all of the following features:

- The interior plane is positioned 40 to 50 degrees relative to the substrate axis.
- The central partially reflective portion is substantially centered about a center of the outer transmissive portion.
- The central partially reflective portion is offset from a center of the outer transmissive portion.
- The method further includes: transmitting, by a polarization filter of the central partially reflective portion, light having a first polarization; and reflecting, by the polarization filter, light having a second polarization. The light from the sample has the first polarization and the second polarization, and the light from the overlay projector has the second polarization.
- The aperture forms an opening with substantially the same shape as the central partially reflective portion.
- The aperture forms an opening that is up to 20 percent smaller than the central partially reflective portion.

In certain embodiments, a beamsplitter includes a substrate, an interior plane within the substrate, and an aperture. The substrate comprises a transparent material with an axis and surfaces comprising a first, second, third, and fourth surfaces. The first surface receives light from a sample; the second surface transmits light towards oculars; the third surface receives light from an overlay projector; and the fourth surface transmits light towards a camera. The interior plane is positioned 40 to 50 degrees relative to the substrate axis and includes a central partially reflective portion and an outer transmissive portion. The central partially reflective portion: transmits a portion of light from the first surface to the second surface to direct light from the sample towards the oculars; reflects a remaining portion of light from the first surface to the fourth surface to direct light from the sample towards the camera; and reflects light from the third surface to the first surface to direct light from the overlay projector towards the oculars. The outer transmissive portion: transmits light from the first surface to the second surface to direct light from the sample towards the oculars; and transmits light from the third surface to the fourth surface to direct light from the overlay projector towards an aperture that blocks the light. The aperture forms an opening having substantially the same shape as the central partially reflective portion and is up to 20 percent smaller than the central partially reflective portion.

Embodiments may include the following feature:

The central partially reflective portion has a polarization filter that transmits light having a first polarization and reflects light having a second polarization. The light from the sample has the first polarization and the second polarization, and the light from the overlay projector has the second polarization.

DESCRIPTION OF EXAMPLE EMBODIMENTS

Figure 1:
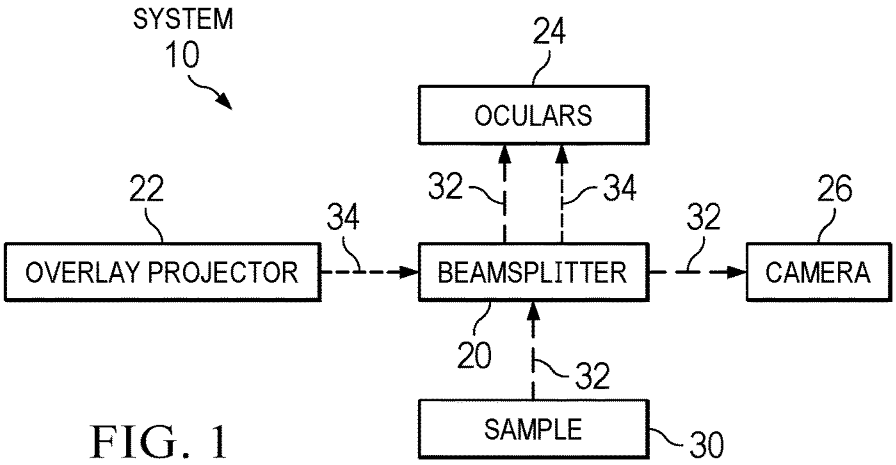
FIG. 1 illustrates an example of a system that includes a beamsplitter that can direct light from different sources towards different destinations, according to certain embodiments.

Referring now to the description and drawings, example embodiments of the disclosed apparatuses, systems, and methods are shown in detail. The description and drawings are not intended to be exhaustive or otherwise limit the claims to the specific embodiments shown in the drawings and disclosed in the description. Although the drawings represent possible embodiments, the drawings are not necessarily to scale and certain features may be simplified, exaggerated, removed, or partially sectioned to better illustrate the embodiments.

Optical beamsplitters can be used in optical systems such as microscopes to deliver light beams from different sources to different destinations. In certain microscopes, a beamsplitter directs light from a sample towards a camera and oculars and light from an overlay projector towards the oculars, such that a user can view the sample with the overlay and the camera can record an image of the sample. For example, a standard aperture-spot beamsplitter has a combination of a partially reflective surface, an opaque spot, and an aperture to direct light. As another example, a standard polarization beamsplitter has a partially reflective polarization surface and may have a polarization filter to direct light. These known beamsplitters, however, may not be able to effectively deliver light in certain applications. Accordingly, beamsplitter embodiments that more effectively deliver light are described herein.

According to certain embodiments, a beamsplitter directs light from a sample and overlay projector towards the oculars and from the sample towards a camera. The beamsplitter includes an interior plane within a transparent material. The interior plane has an outer transmissive portion and a central reflective portion. The outer transmissive portion transmits light from the sample towards the oculars. The central partially reflective portion reflects some light from the sample towards the camera and transmits the remaining light towards the oculars. The central partially reflective portion reflects light from the overlay projector towards the oculars.

Certain embodiments of the interior plane deliver more light to the oculars and at least a much light to the camera than known aperture-spot and polarization beamsplitters deliver. Moreover, unlike the known aperture-spot beamsplitter, the beamsplitter described herein utilizes the center rays of light from the overlay projector, yielding better image quality for the camera and projector.

FIG. 1 illustrates an example of a system 10 that includes a beamsplitter 20 that can direct light from different sources towards different destinations, according to certain embodiments. In the example, beamsplitter 20 is part of a microscope that includes an overlay projector 22, oculars 24, and a camera 26. The microscope may be used to view a sample 30. As an overview of operation, beamsplitter 20 receives light 32 emitted or reflected from sample 30, and directs light 32 along light beam paths towards oculars 24 and camera 26. Beamsplitter 20 receives light 34 from overlay projector 30 and directs light 34 towards oculars 24.

In more detail, sample 30 may be a body part or body tissue of a patient undergoing a diagnostic examination or a surgical treatment. For example, sample 30 may be the eye or eye tissue of a patient. Overlay projector 22 provides an overlay that is inserted into light beam paths such that the overlay is superimposed over the image of sample 30. Overlay projector 22 may be a display that displays images, e.g., a liquid-crystal display (LCD), such as a liquid-crystal on silicon (LCOS) display, which in general projects light polarized in only one direction. The overlay may comprise any suitable information, such as information describing sample 30 or a treatment for sample 30. For example, the information may describe the eye of the patient or may describe a treatment for the eye.

Oculars 24 include one or more lenses that receive light to present images to a user. Oculars 24 may be eyepieces, e.g., microscope eyepieces. Camera 26 (e.g., a digital camera) includes light sensors that detect light and generate a signal that can be used to generate images. Camera 26 may display the images via a monitor and/or eyepieces.

Figure 2:
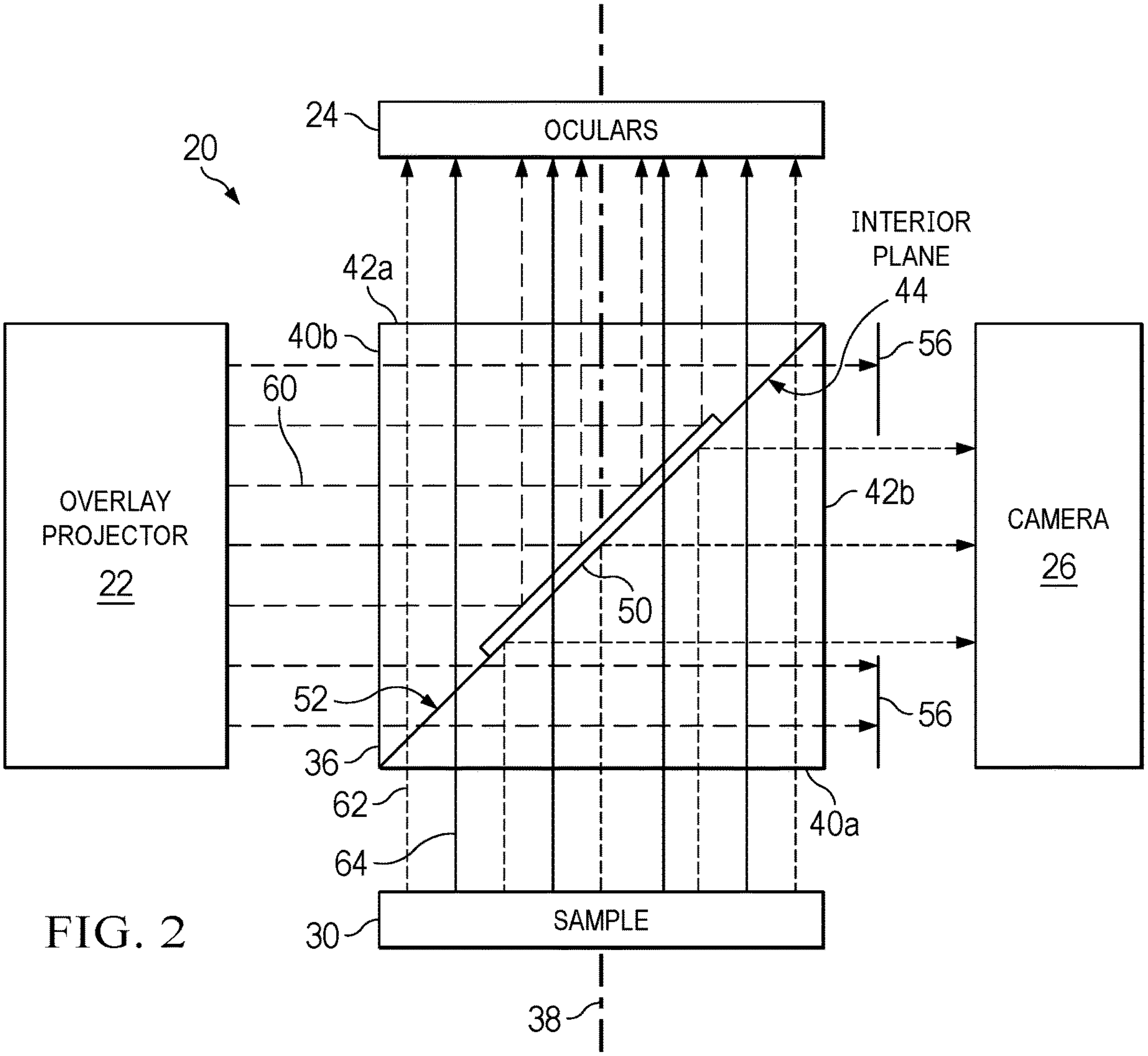
FIG. 2 illustrates an example of a beamsplitter that may be used in the system of FIG. 1.

FIG. 2 illustrates an example of a beamsplitter 20 that may be used in system 10 of FIG. 1. In the example, beamsplitter 20 is used with an aperture 56 that controls the amount of light that reaches camera 26. As an overview, beamsplitter 20 comprises a substrate 36 with an axis 38, surfaces 40, 42, and an interior plane 44 within substrate 36. Interior plane 44 has a central partially reflective portion 50 and an outer transmissive portion 52.

Beamsplitter 20 may have any suitable size and shape. In certain embodiments, beamsplitter 20 is a rectangular box (e.g., a cube) with sides in the range of 1 to 10, 10 to 15, 15 to 25, 25 to 30, and/or 30 to 50 millimeters (mm). For example, beamsplitter 20 may be a cube with sides in the range of 15 to 25 mm, such as 20 mm.

Substrate 36 comprises a transparent material, such as plastic, glass, or other suitable transparent material, with surfaces 40, 42. Surfaces 40, 42 comprise input surfaces 40 (40*a*, 40*b*) and output surfaces 42 (42*a*, 42*b*). Input surface 40*a* receives light from sample 30, and input surface 40*b* receives light from overlay projector 22. Output surface 42*a* transmits light towards oculars 24, and output surface 42*b* transmits light towards camera 26. Axis 38 is any suitable imaginary line (typically a centrally located line) that can be used to describe the position of beamsplitter 20. In the example, axis 38 is a geometrical axis of beamsplitter 20 that follows the optical beam path from input surface 40*a* to output surface 42*a*.

Interior plane 44 is a plane within substrate 36 at any suitable position, such as at an angle of 40 to 50 degrees (e.g., 45 degrees) to axis 38. Interior plane 44 has a central partially reflective portion 50 (or "central portion 50") and an outer transmissive portion 52 (or "outer portion 52"). Central portion 50 transmits a portion of light and reflects the remaining portion of light. For example, portion 50 may transmit 40% to 60% (such as 50%) of light and reflect the remaining portion, e.g., if the light from the sample is not polarized, 50% of the light is transmitted and 50% of the light is reflected. Central portion 50 may transmit/reflect light in any suitable manner. For example, portion 50 may have a polarization filter or coating that transmits light of one polarization (e.g., s-polarization) and reflects light of another polarization (e.g., p-polarization). Outer portion 52 transmits light.

Aperture 56 controls the amount of light that reaches camera 26 by limiting the amount of light that passes through an opening. In certain embodiments, aperture 56 blocks at least most, if not all, of the light from overlay projector 22 from reaching camera 26. In the embodiments, the size and shape of aperture 56 may form an opening that is substantially the same as or smaller that (e.g., up to 10 or 20% smaller) as that of central portion 50, as viewed from a surface 40*b*, 42*b*. A smaller opening may better block the light. In other embodiments, aperture 56 may be placed between beamsplitter 20 and overlay projector 22.

In the illustrated example, overlay projector 22 is an LCOS display that projects p-polarized light 60. Sample 30 reflects p-polarized light 62 and s-polarized light 64. In an example of operation, for light from sample 30, central partially reflective portion 50 transmits s-polarized light 64 from surface 40*a* to surface 42*a* to direct light from sample 30 towards oculars 24, and reflects p-polarized light 62 from surface 40*a* to surface 42*b* to direct light from sample 30 towards camera 26. For light from overlay projector 22, central partially reflective portion 50 reflects p-polarized light 60 from surface 40*b* to surface 42*a* to direct light from overlay projector 22 towards oculars 24. Outer transmissive portion 52 transmits light (p-polarized light 62 and s-polarized light 64) from surface 40*a* to surface 42*a* to direct light from sample 30 towards oculars 24. P-polarized light 60 from overlay projector 22 is transmitted from surface 40*b* to surface 42*b*, but aperture 56 blocks at least most, if not all, of the light from reaching camera 26. In other embodiments, one or more polarizers may further polarize the polarized light. For example, a polarizer may be placed between beamsplitter 20 and overlay projector 22 and/or between beamsplitter 20 and camera 26.

Figure 3A:
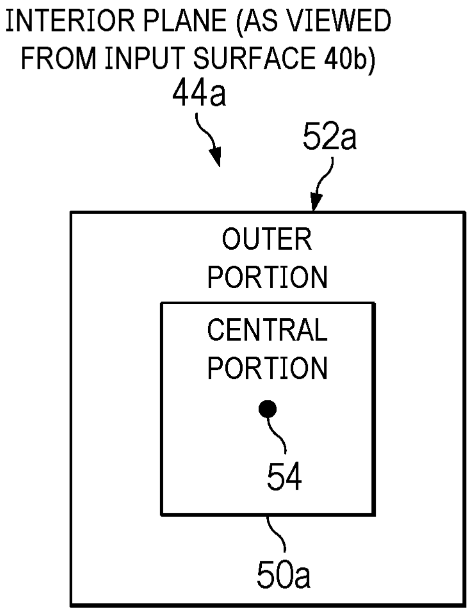
FIGS. 3A and 3B illustrate examples of an interior plane with a central partially reflective portion and an outer transmissive portion.
Figure 3B:
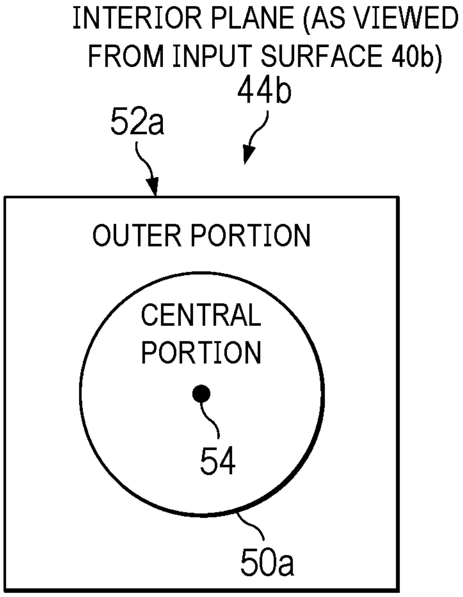

FIGS. 3A and 3B illustrate examples of an interior plane 44 (44*a*, 44*b*) of beamsplitter 20 of FIG. 1 with central portion 50 (50*a*, 50*b*, respectively) and outer portion 52 (52*a*, 52*b*, respectively), as viewed from surface 40*b*, 42*b*. That is, the examples illustrate portions 50, 52 as if they were projected onto surface 40*b* or 42*b*. If portions 50, 52 were viewed from the angle of interior plane 44, they would be slightly elongated. In certain embodiments, outer portion 52 is bordered by the surfaces of beamsplitter 20, which determines the size and shape of portion 52.

Central portion 50 may have any suitable position relative to outer transmissive portion 52. For example, central portion 50 may be substantially centered about a center 54 of outer portion 52, which may be where axis 38 intersects interior plane 44. In another example, central portion 50 may be off-center or even touch the side of outer portion 52. In the example, the center of portion 50 may be offset from center 54 a distance that is in a range of 0 to 10, 10 to 30, 30 to 60, and/or greater than 60% of the length of a side of outer portion 52*a*. For example, portion 50 may be offset a distance equivalent to 5% of the length of a side.

In addition, central portion 50 may have any suitable size and shape. In FIG. 3A, central portion 50*a* is a square of any suitable size. For example, if a side of outer portion 52*a* is 15 to 25 mm, such as 20 mm, a side of central portion 50*a* (as viewed from surface 40*b*, 42*b*) may be 5% to 20%, 20% to 40%, 40% to 60% of the side, such as 1 to 19 mm, e.g., 10 mm. In FIG. 3B, central portion 50*b* is a circle of any suitable size. For example, if a side of outer portion 52*a* is 15 to 25 mm, such as 20 mm, the diameter of central portion 50*a* (as viewed from surface 40*b*, 42*b*) may be 5% to 20%, 20% to 40%, 40% to 60%, 60% to 80%, and/or 80% to 100% of the side, such as 1 to 19 mm, e.g., 10 mm. As discussed previously, the size and shape of aperture 56 may form an opening substantially the same as or smaller than that of central portion 50, as viewed from a surface 40*b*, 42*b*.

Figure 4:
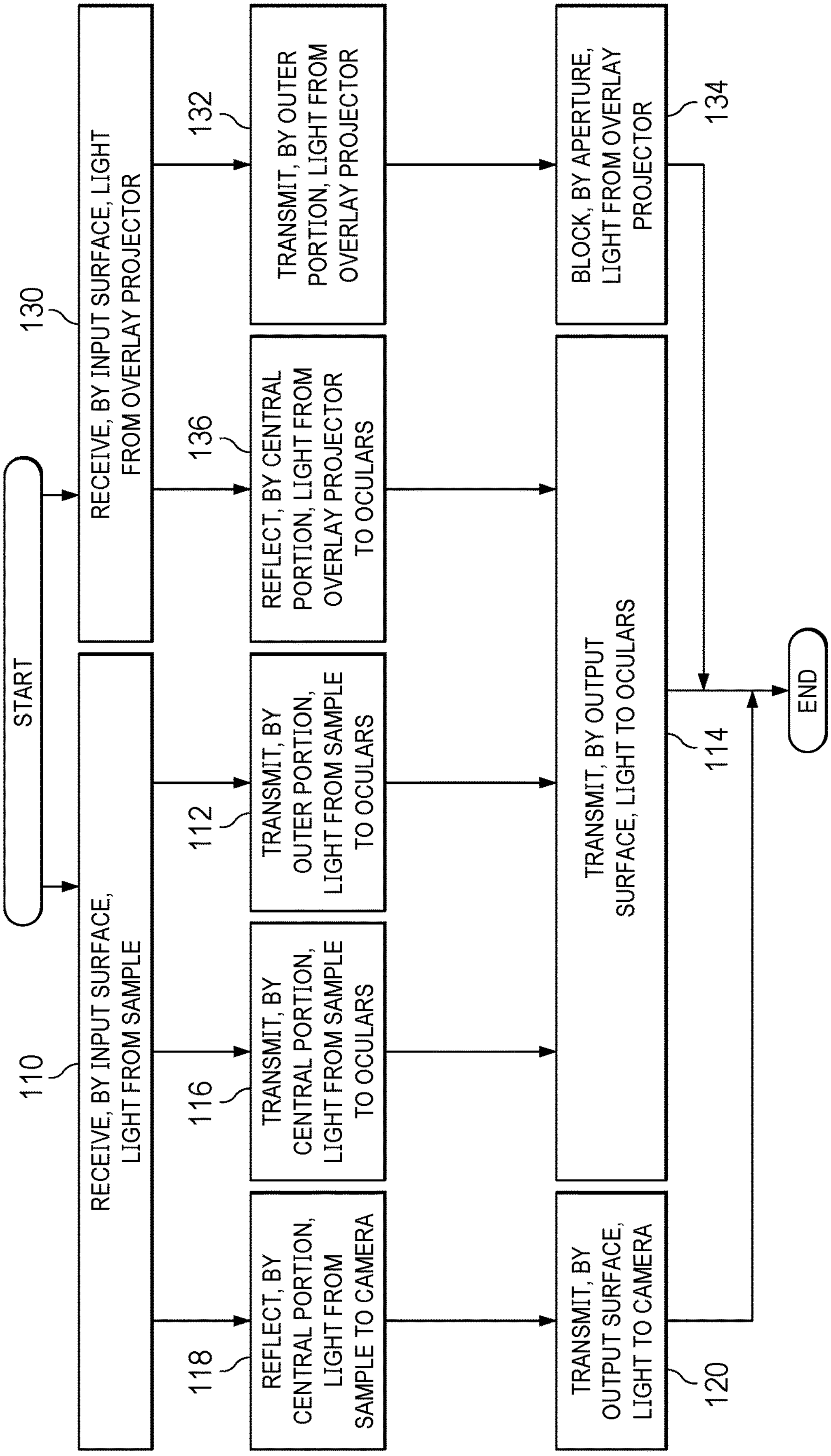
FIG. 4 illustrates an example of a method performed by the beamsplitter of FIG. 1 to direct light from a sample and overlay projector towards a camera and/or oculars, according to certain embodiments.

FIG. 4 illustrates an example of a method performed by the beamsplitter of FIG. 1 to direct light from a sample and overlay projector towards a camera and/or oculars, according to certain embodiments.

Step 110 starts the description of how the beamsplitter directs light from the sample. A sample input surface of the beamsplitter receives the light from the sample at step 110. An outer portion of an inner plane of the beamsplitter transmits the sample light towards the oculars at step 112. An ocular output surface of the beamsplitter transmits the light towards the oculars at step 114. A central portion of the inner plane transmits some of the sample light towards the oculars at step 116, and the ocular output surface transmits the light towards the oculars at step 114. The central portion reflects the remaining sample light towards the camera at step 118, and the camera output surface of the beamsplitter transmits the light towards the camera at step 120.

Step 130 starts the description of how the beamsplitter directs light from the overlay projector. A projector input surface of the beamsplitter receives light from the overlay projector at step 130. The outer portion transmits the overlay projector light at step 132, and an aperture blocks at least some of the light from reaching the camera at step 134. The central portion reflects the overlay projector light towards the oculars at step 136. The ocular output surface transmits the light towards the oculars at step 114.

Although this disclosure has been described in terms of certain embodiments, modifications (such as changes, substitutions, additions, omissions, and/or other modifications) of the embodiments will be apparent to those skilled in the art. Accordingly, modifications may be made to the embodiments without departing from the scope of the invention. For example, modifications may be made to the systems and apparatuses disclosed herein. The components of the systems and apparatuses may be integrated or separated, or the operations of the systems and apparatuses may be performed by more, fewer, or other components, as apparent to those skilled in the art. As another example, modifications may be made to the methods disclosed herein. The methods may include more, fewer, or other steps, and the steps may be performed in any suitable order, as apparent to those skilled in the art.

To aid the Patent Office and readers in interpreting the claims, Applicants note that they do not intend any of the claims or claim elements to invoke 35 U.S.C. § 112 (f), unless the words "means for" or "step for" are explicitly used in the particular claim. Use of any other term (e.g., "mechanism," "module," "device," "unit," "component," "element," "member," "apparatus," "machine," "system," "processor," or "controller") within a claim is understood by the applicants to refer to structures known to those skilled in the relevant art and is not intended to invoke 35 U.S.C. § 112 (f).

What is claimed:

1. A beamsplitter comprising:

a substrate comprising transparent material, the substrate having an axis and a plurality of surfaces comprising:
a first surface configured to receive light from a sample;
a second surface configured to transmit light towards oculars;
a third surface configured to receive light from an overlay projector; and
a fourth surface configured to transmit light towards a camera; and an interior plane within the substrate, the interior plane comprising:
a central partially reflective portion configured to:
transmit a portion of light from the first surface to the second surface to direct light from the sample towards the oculars;
transmit light having a first polarization and reflect light having a second polarization, the light from the sample having the first polarization and the second polarization, the light from the overlay projector having the second polarization;
reflect a remaining portion of light from the first surface to the fourth surface to direct light from the sample towards the camera; and
reflect light from the third surface to the second surface to direct light from the overlay projector towards the oculars; and
an outer transmissive portion configured to:
transmit light from the first surface to the second surface to direct light from the sample towards the oculars; and
transmit light from the third surface to the fourth surface to direct light from the overlay projector towards an aperture configured to block the light.

2. The beamsplitter of claim 1, the interior plane positioned 40 to 50 degrees relative to the substrate axis.

3. The beamsplitter of claim 1, the central partially reflective portion substantially centered about a center of the outer transmissive portion.

4. The beamsplitter of claim 1, the central partially reflective portion offset from a center of the outer transmissive portion.

5. The beamsplitter of claim 1, the central partially reflective portion having a substantially square shape, as viewed from the third surface.

6. The beamsplitter of claim 1, the central partially reflective portion having a substantially circular shape, as viewed from the third surface.

7. The beamsplitter of claim 1, the aperture forming an opening having substantially the same shape as the central partially reflective portion.

8. The beamsplitter of claim 1, the aperture forming an opening up to 20 percent smaller than the central partially reflective portion.

9. A method for directing light comprising:

receiving, by a beamsplitter, light from a sample and an overlay projector, the beamsplitter having a substrate comprising transparent material, the substrate having an axis and an interior plane with a central partially reflective portion and an outer transmissive portion, the substrate comprising a first surface configured to receive light from the sample, a second surface configured to transmit light towards oculars, a third surface configured to receive light from the overlay projector, and a fourth surface configured to transmit light towards a camera, the light from the sample having a first polarization and a second polarization, the light from the overlay projector having the second polarization;

transmitting, by the outer transmissive portion, light from the first surface to the second surface to direct light from the sample towards the oculars;

transmitting, by the central partially reflective portion, a portion of light from the first surface to the second surface to direct light from the sample towards the oculars;

transmitting, by a polarization filter of the central partially reflective portion, light having the first polarization;

reflecting, by the central partially reflective portion, a remaining portion of light from the first surface to the fourth surface to direct light from the sample towards the camera;

reflecting, by the polarization filter, light having the second polarization;

transmitting, by the outer transmissive portion, light from the third surface to the fourth surface to direct light from the overlay projector towards an aperture;

blocking, by the aperture, light received from the fourth surface; and reflecting, by the central partially reflective portion, light from the third surface to the second surface to direct light from the overlay projector towards the oculars.

10. The method of claim 9, the interior plane positioned 40 to 50 degrees relative to the substrate axis.

11. The method of claim 9, the central partially reflective portion substantially centered about a center of the outer transmissive portion.

12. The method of claim 9, the central partially reflective portion offset from a center of the outer transmissive portion.

13. The method of claim 9, the aperture forming an opening having substantially the same shape as the central partially reflective portion.

14. The method of claim 9, the aperture forming an opening up to 20 percent smaller than the central partially reflective portion.

15. A beamsplitter comprising:

a substrate comprising transparent material, the substrate having an axis and a plurality of surfaces comprising:
a first surface configured to receive light from a sample;
a second surface configured to transmit light towards oculars;
a third surface configured to receive light from an overlay projector; and
a fourth surface configured to transmit light towards a camera;

an interior plane within the substrate, the interior plane positioned 40 to 50 degrees relative to the substrate axis, the interior plane comprising:
a central partially reflective portion configured to:
transmit a portion of light from the first surface to the second surface to direct light from the sample towards the oculars;
transmit light having a first polarization and reflect light having a second polarization, the light from the sample having the first polarization and the second polarization, the light from the overlay projector having the second polarization;
reflect a remaining portion of light from the first surface to the fourth surface to direct light from the sample towards the camera; and reflect light from the third surface to the second surface to direct light from the overlay projector towards the oculars; and an outer transmissive portion configured to:

transmit light from the first surface to the second surface to direct light from the sample towards the oculars; and transmit light from the third surface to the fourth surface to direct light from the overlay projector towards an aperture configured to block the light; and the aperture, the aperture forming an opening having substantially the same shape as the central partially reflective portion, the opening up to 20 percent smaller than the central partially reflective portion.

* * * * *